(No Model.)
M. T. HANCOCK.
ROTARY PLOW.
No. 506,815. Patented Oct. 17, 1893.
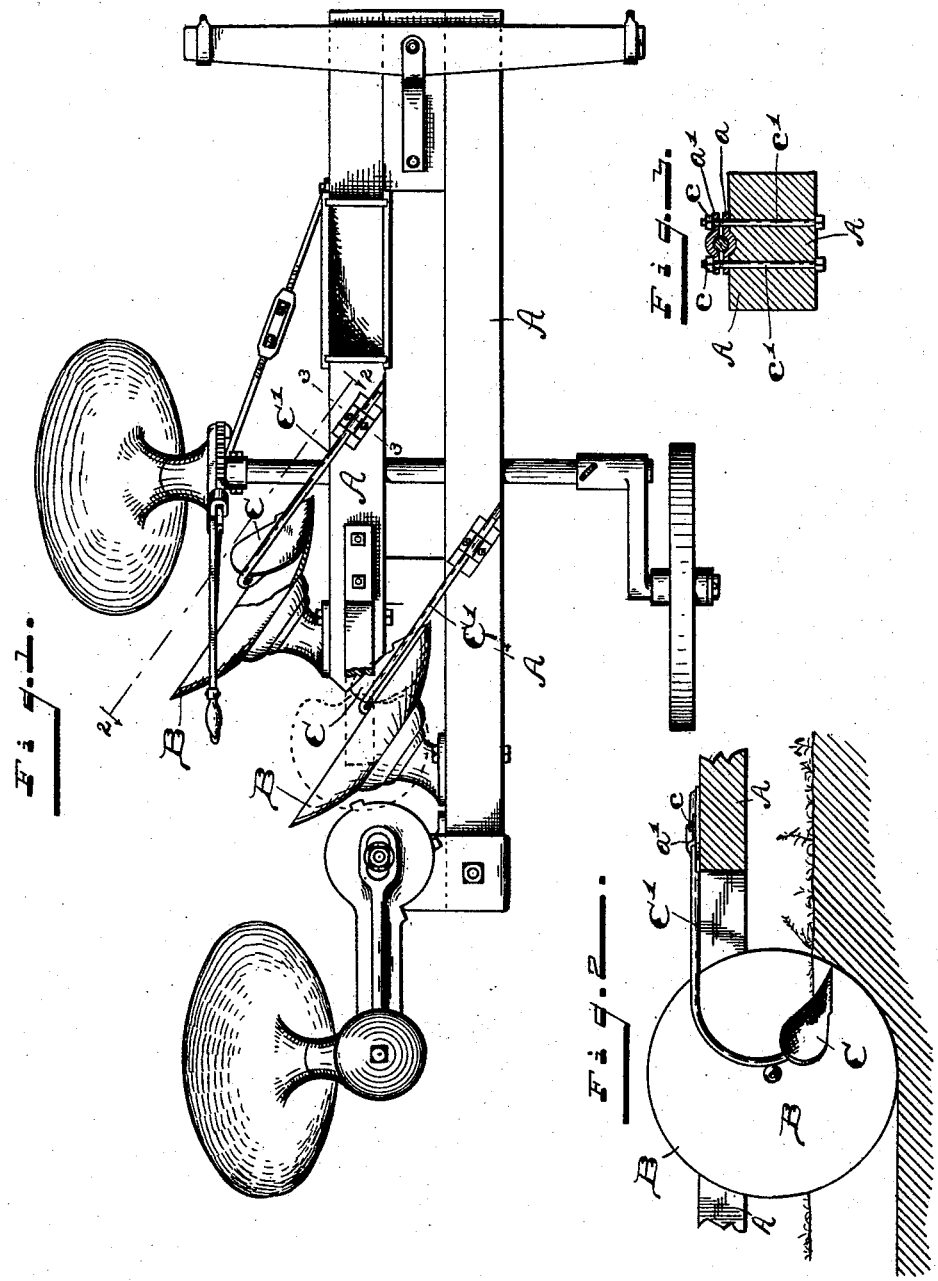
WITNESSES:
F. W. Warner
J. A. Walsh
INVENTOR
Millen T. Hancock
her
Chester Bradford,
ATTORNEY.

UNITED STATES PATENT OFFICE.

MILTON T. HANCOCK, OF SHREVEPORT, LOUISIANA.

ROTARY PLOW.

SPECIFICATION forming part of Letters Patent No. 506,815, dated October 17, 1893.

Application filed November 1, 1892. Serial No. 450,614. (No model.)

*To all whom it may concern:*

Be it known that I, MILTON T. HANCOCK, a citizen of the United States, residing at Shreveport, in the parish of Caddo and State of Louisiana, have invented certain new and useful Improvements in Rotary Plows, of which the following is a specification.

My present invention consists in certain improvements upon that for which Reissued Letters Patent No. 11,257 were granted me, dated August 9, 1892, and for which I have made application, Serial No. 449,489, filed October 20, 1892, for further improvements, whereby said plow is better adapted to meet the requirements where the ground to be plowed is covered with turf or stubble; and it consists in providing such plows with small plow-shares bearing a peculiar relation to the plowing disks, and in certain details of construction, as will be hereinafter more particularly described and claimed.

Referring to the accompanying drawings, which are made a part hereof, and on which similar letters of reference indicate similar parts, Figure 1 is a top or plan view of a plow embodying my present invention, certain parts being broken away to show said invention more clearly; Fig. 2 a detail elevation, as seen from the dotted line 2 2 in Fig. 1, showing the vertical relation of the plow-share to the plowing disk, in operation, and Fig. 3 a transverse vertical sectional view on the dotted line 3 3 in Fig. 1, showing more plainly the method of clamping the bars carrying the shares, in place.

In said drawings the portions marked A represent the frame-work; B the plowing disks, and C the plow-shares.

The frame-work A and plowing disks B, as well as the other parts of the plow, are or may be similar to those shown and described in said aforementioned Letters Patent and application.

The plow-share C is carried by a suitable bar C', which is preferably formed from a bar of round iron, and which is clamped by means of suitable bearings firmly to the frame A. Said plow-share C as shown most plainly in Fig. 1, (where a portion of one of the plowing disks is broken away to expose it more plainly to view) should fit closely inside the forward edge of said plowing disk, and thence curve backward and upward to the rear and side, as shown, so that it will discharge the turf which it cuts over into the bottom of the furrow last plowed, where it will be buried by the earth turned by the plowing disk B, which closely follows it. In other words, the plow-share C skims off the greater portion of the turf in front of the plowing disk, and deposits it where said plowing disk can conveniently bury it in regular plowing operation. It will be readily seen that this not only buries the turf effectually, which is extremely desirable in plowing ground of the character described, but also pulverizes the earth much more thoroughly than in any other manner, and leaves it more nearly in condition for seeding or planting, and, in effect, performs by the one operation what is usually only accomplished by the two operations of plowing and harrowing, in addition to burying the turf as above described. The bar C' extends forward across the frame-work A, and preferably rests between the box portions $a$ $a'$, the upper or cap portion $a'$ being adapted to be loosened, so that said bar may be adjusted as desired by a manipulation of the nuts $c$ on the bolts $c'$. The position of the plow-share C may, of course, be adjusted according to the requirements of the work. I have found by experiment that it should occupy substantially the position shown, in plowing ordinary turf and dry ground.

Having thus fully described my said invention, what I claim as new, and desire to secure by Letters Patent, is—

1. The combination, with the concave diagonally set plowing disk of a rotary plow, of the plow-share arranged in close proximity thereto and adapted to skim the turf from the ground in advance of said plowing disk, substantially as set forth.

2. The combination, with a concave diagonally set plowing disk of a rotary plow, of a plow-share formed to fit closely near the interior surface of said plowing disk near its forward edge and curve thence upwardly and outwardly, and a bar C' upon which it is mounted and whereby it is held in position, substantially as set forth.

3. The combination, in a rotary plow, of the frame-work, the concave diagonally set plowing disks thereon, the axle, the land-wheel, the staggered guide wheels, and plow-shares secured to the frame-work and fitting within and near to the concave side of said plowing disks near to the front edges thereof and at a point near the surface of the ground in operation, said several parts being arranged and operating substantially as shown and described.

In witness whereof I have hereunto set my hand and seal, at Indianapolis, Indiana, this 28th day of October, A. D. 1892.

MILTON T. HANCOCK. [L. S.]

Witnesses:
CHESTER BRADFORD,
JAMES A. WALSH.